United States Patent Office

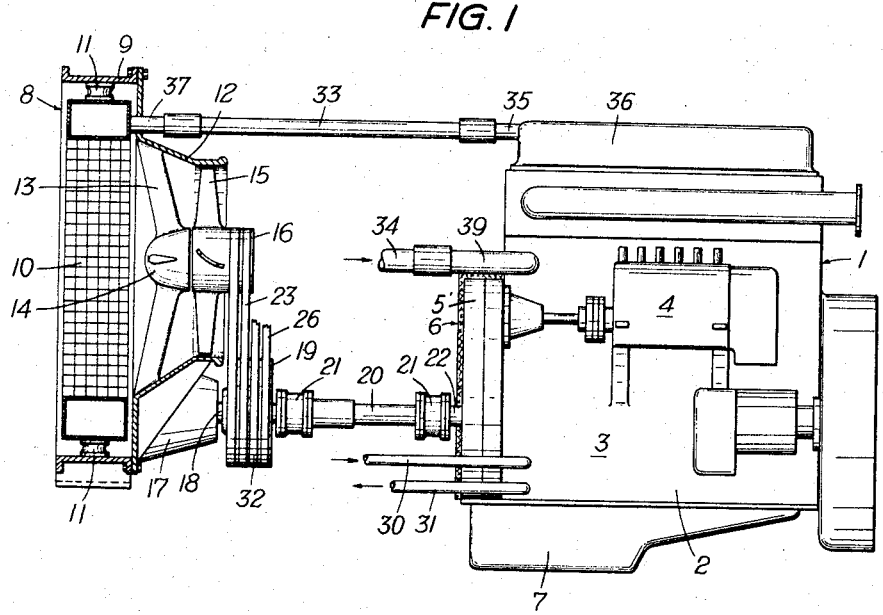

3,412,724
Patented Nov. 26, 1968

3,412,724
SOUNDPROOFED INTERNAL COMBUSTION ENGINE
Andreas Scheiterlein and Gerhard Thien, Graz, Austria, assignors to Hans List, Graz, Austria
Filed Dec. 21, 1966, Ser. No. 603,667
Claims priority, application Austria, Jan. 10, 1966, A 185/66
9 Claims. (Cl. 123—195)

ABSTRACT OF THE DISCLOSURE

A soundproofed internal combustion engine having a sound-absorbing coating on the outer surface of a cylinder block and an equipment-carrier as an independent structural unit in front of the cylinder block with various auxiliary machines and accessories mounted on the carrier.

---

Figure 4:
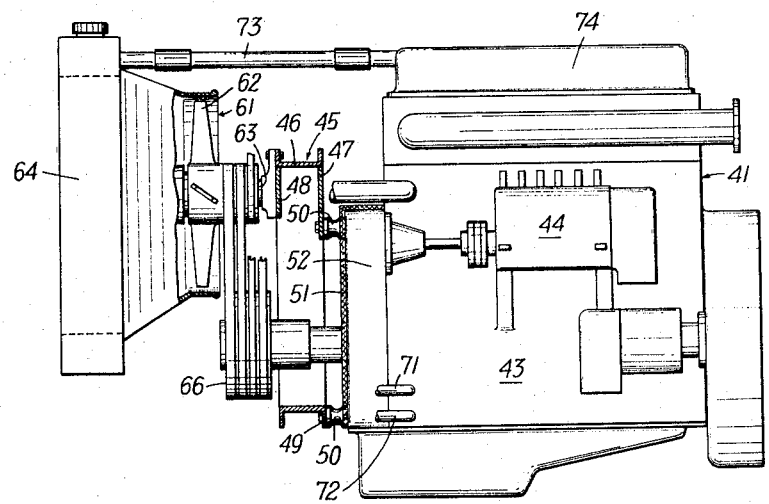

Evolution in modern internal combustion engine design has been accompanied by a steady increase in the number of auxiliary appliances and other accessories, including the fuel injection pump and its operating mechanism for fuel-injection-type internal combustion engines, arranged around the cylinder block and rigidly attached to same by metallic means. These accessories, augmenting in volume as engine speed ratings increase with the continuous progress in engine design, tend to occupy an ever greater portion of the space available on both sides of the crankcase. Besides, with rising speed ratings, noise radiation from the engine is also bound to increase. The ever greater surface area of the cylinder block proper and of its auxiliary machines contributes to the rise of the noise level of the engines. Therefore, the designer is frequently called upon to counteract this objectionable by-product of modernization by ever more effective noise abatement methods.

The sidewalls of the crankcase as well as the walls of the gearbox have been found to account for a major portion of the noise produced by an engine assembly. These walls which are directly subject to the vibrations of the engine present large areas of sound radiation in an outwardly direction. Therefore, certain conventional types of engines are known to provide for the partial coating of the sides of the crankcase and of the gearbox with some sound-absorbing material. However, application of this actually effective sound-attenuating coating to the crankcase walls is impeded to a considerable extent by the presence of large numbers of auxiliary appliances and accessories, since not only the areas of attachment of the cylinder heads, pipes etc., but also the areas where the auxiliary machines are to be mounted must be left uncoated, as a result of which the coating operation is not only rendered difficult but also tiresome and time-consuming. But even where the exposed areas of the crankcase walls are partly coated, such accessories as are attached to the crankcase directly by metallic means, such as the oil filter, oil cooler, water pump, dynamo, fan, compressor etc., will still project a major portion of the overall noise from the crankcase walls in an outwardly direction.

Similar difficulties are encountered in connection with other conventional types of engines wherein the outer walls of the cylinder block are perforated for the purpose of sound-insulation, the said perforations being covered by means of lids made of some sound-attenuating material. These lids extending over the entire height of the crankcase are not suitable for the attachment of accessories of any kind, as they neither have the required rigidity nor the necessary thickness for the provision of threaded bores or the like.

Consequently, neither of these conventional methods are sufficient to cope with the ever increasing need for quiet operation of high-speed internal combustion engines.

It is the object of the invention to devise ways and means of reducing the sound-radiation of internal combustion engines to the minimum. According to the invention, auxiliary appliances and accessories of the engine, with the exception of the fuel injection pump, if any, are arranged on a separate equipment-carrier apart from the cylinder block which is at least in part provided with a sound-attenuating coating in a manner known per se. Thus the outer surfaces of the cylinder block which are responsible for sound-radiation can be insulated against sound radiation to any desired extent, unencumbered by auxiliary machines and other accessories, in such a manner that the type and thickness of the sound-absorbing layer can be selected without any limitations so as to suit given conditions. The provision of a separate equipment carrier confronts the designer with a wholly novel situation which enables him to shape and arrange the auxiliary machines and accessories exactly as he may deem fit. In addition, separation of the auxiliary machines from the cylinder block offers an advantage insofar as engine vibrations are not transmitted to the said accessories and it is furthermore possible to further attenuate even minor operational noises produced by the auxiliary units by effective sound proofing methods. Moreover, it will not be necessary for the selection of suitable soundproofing materials to take their resistance to changes of temperature into account since these insulators are not subject to the usual thermal stress caused by the hot walls of the cylinder block. Consequently, there is no objection whatsoever to the use of rubber or synthetic materials of poor resistance to temperature changes for the soundproofing of the auxiliary equipment.

According to a preferred embodiment of the invention, the equipment-carrier is designed as a frame to which the auxiliary units and engine accessories are attached either individually or as combined assemblies, if necessary with the interposition of silent blocks capable of attenuating the sound conducted through solids. By appropriately shaping the frame and the connectors for the auxiliary equipment it will be possible to conveniently adapt the equipment-carrier to any given space conditions. In particular, it will be possible to locate the mounting attachments for the accessories to be fastened to the equipment-carrier in such a manner as to provide easy access to them for assembling and disassembling operations. As a result, the cost of repairs will be substantially reduced as compared with the conventional arrangement of the auxiliary units.

According to a further feature of the invention the auxiliary units are drivingly connected with the driven shaft of the engine via sound-absorbing intermediate members, for example via a drive shaft comprising flexible plate-type joints, thereby eliminating the transfer of sound conducted through solids from the engine to the auxiliary units practically completely. Likewise, such resonance phenomena and vibrations of the accessories as generally occur within certain speed ranges, are thereby avoided. At the same time, such torsional oscillations as are liable to be caused by the irregular running of the engine are attenuated to a certain extent by the flexible intermediate members.

According to the invention, a particularly convenient design provides for example for a U-section frame surrounding the water radiator, the remaining auxiliary units being arranged around the frame and driven jointly with the fan located behind the water radiator via V-belts or the like by means of a common shaft drivingly connected with the engine. Such an equipment carrier not only presents a comparatively short overall length but offers also the advantage of free accessibility of all auxiliary units so that any of these units can be replaced or repaired without the necessity of simultaneously removing or disassembling other accessories. The particularly delicate water-radiator is effectively protected against mechanical damage by means of the surrounding frame. Yet the front face of the radiator is freely accessible so that minor repairs such as for example, the elimination of minor leaks of the radiator honeycombs by soldering can be performed without having to remove the radiator.

According to the invention the fan and if necessary, also the water pump can be arranged in coaxial relation to the driven shaft of the engine and directly driven by the said shaft. Due to the absence of an intermediate shaft and its bearings the design of the equipment-carrier will be particularly compact and space-saving and moreover, operational noises are attenuated still further.

In certain cases it will be found convenient to provide a hydrostatic oil-engine-pump-drive for the driving connection between the engine and the auxiliary units. This type of drive will preferably be used where for considerations of installation the engine is located at a certain distance from the equipment-carrier.

For the application of the soundproofing layer the designer is in principle, free to choose between two different methods, the relative suitability of which will be determined with due consideration of prevailing conditions. According to the invention, the first method consists in applying the said layer in a manner known per se by providing a coating of sound-absorbing material adhering to the external surface of the cylinder block. This method which is also applicable to already existing internal combustion engines is easy to perform and inexpensive. In the event of mechanical damage, this coating can be readily replaced.

According to the invention the second possibility of forming a sound-absorbing layer consists in providing the outer walls of the cylinder block in a manner known per se with perforations covered by means of lids made of some soundproofing material, such as sandwiched metal sheets or coated plastic lids. As a rule, this latter method will be resorted to if the engine already presents similar perforations or in the case of newly designed cylinder blocks where the loss of solidity caused by the perforations can be compensated by adequate reinforcements such as bracing of the crankcase by means of ribs or the like.

According to the invention a particularly space-saving and easily mounted type of a soundproofed internal combustion engine features an equipment-carrier connected with the crankcase with the interposition of shim plates capable of absorbing sound conducted through solids. In that case, the engine and the equipment carrier form a joint assembly which, while fully preserving the advantages resulting from the arrangement of the auxiliary units and accessories on a separate equipment-carrier as distinct from the cylinder block, requires the same space as conventional types of engines, and in some cases even less. For the serial production of internal combustion engines the combination of a cylinder block and an equipment-carrier so as to produce a single unit greatly facilitates assembling operations and reduces production costs considerably. For example, the engines can be completely assembled on the main assembly line and independently therefrom the equipment-carriers can be assembled on a secondary assembly-line and subsequently joined to form a single structural unit. Since the connections of the equipment carrier for the auxiliary units can be easily so designed as to be readily accessible, the cost of assembling the whole unit is considerably reduced as compared with conventional types of engines where the mounting of the auxiliary appliances is frequently a tiresome and highly complicated operation.

Moreover, the designer is thereby offered an opportunity of providing the connections for the equipment-carrier on the crankcase in particularly convenient locations, such as for example, on one of the sidewalls of the crankcase, if a particularly compact design is required.

For use as silent blocks capable of absorbing sound conducted through solids to be provided at the junctions between the equipment carrier and the crankcase, rubber elements are particularly suitable in view of their excellent soundproofing properties. However, synthetic materials may also be used for the purpose, provided they are able to resist the wall temperature prevailing at the said junctions. At the same time, these silent blocks attenuate vibrations transmitted from the engine to the equipment-carrier.

According to another feature of the invention the equipment-carrier can be designed as a cast hollow body to which both the auxiliary units and their oil and water pipes are connected. This design dispenses with conventional pipe and hose connections among individual auxiliary units and is therefore, particularly advantageous because it not only facilitates the manufacturing process but simplifies also the sealing of the oil and water-carrying systems of the internal combustion engine. Moreover, the use of a hollow body serving as an equipment carrier affords a particularly space-saving design in addition to providing an effective means for additionally attenuating the noise produced by the auxiliary units partly enclosed in the said hollow body.

According to the invention the equipment-carrier may be made of some sound-absorbing material, such as high-strength synthetic resin. Where the equipment-carrier consists of a plate, the same can be made largely non-oscillating by means of appropriate reinforcements and/or ribs and provided with the necessary contact surfaces and bores, so as to eliminate the need for subsequent machining of the plate.

Figure 5:
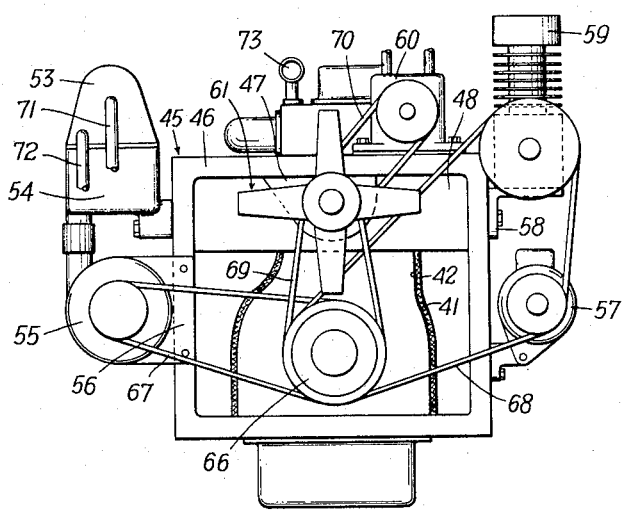

Further details of the invention will appear from the following description of two preferred embodiments of the invention with reference to the accompanying drawings in which FIGURE 1 shows a side elevation of an internal combustion engine according to the invention, FIGURE 2 a front view of the cylinder block of the internal combustion engine shown in FIG. 1, except for such details as are not essential for the scope of the present invention, FIGURE 3 a rear view of the equipment-carrier of the internal combustion engine illustrated in FIG. 1, FIGURE 4 a side elevation of another type of an internal combustion engine, and FIGURE 5 a front view of the same engine.

The internal combustion engine shown in FIG. 1 comprises a cylinder block 1 and auxiliary units and accessories of the engine arranged in spaced relation to the said cylinder block. Attached to the cylinder block 1 are only the fuel injection pump 4 mounted on a sidewall 2 of the crankcase 3 and the electric starter 5. Separation of the fuel injection pump 4 from the cylinder block seems inadvisable because this would involve objectionable extensions of the injection pipes leading to the engine cylinders.

The sidewalls 2 and 2' of the crankcase 3 as well as the external surfaces of the gearbox 5 at the front end of the cylinder block 1 are provided with a very adhesive coating 6 made of some sound-absorbing material. In special cases this coating may also extend over the external surfaces of the oil sump 7. A conventional three-point suspension by means of rubber elements capable of absorbing sound conducted through solids (silent blocks) may be used as a support (not shown) for the cylinder block 1.

For the auxiliary appliances a separate equipment-carrier 8 is provided, which in the embodiment shown in the drawing is designed as a frame presenting a U-shaped section. This frame 9 surrounds the radiator 10 of the internal combustion engine which is attached to the frame 9 with the interposition of soundproofing rubber elements 11 in the area of its edges.

The fan casing 12 tapering off in a rearward direction is attached to the rear of the frame 9 by means of bolts, screws or the like. Inside the fan casing 12 the bearing 14 for the fan shaft with the fan wheel 15 and a V-belt pulley 16 attached to the fan wheel is mounted on a spider 13. On its outside the fan casing 12 comprises another bearing 17 located below the fan shaft and carrying an intermediate shaft 18 which in turn carries a V-belt pulley 19 and is drivingly connected with the crankshaft 22 of the internal combustion engine via a drive shaft 20 with two flexible plate-type joints 21. The fan shaft is driven by means of two V-belts 23 by the intermediate shaft 18 via V-belt pulleys 19 and 16.

The remaining auxiliary machines are arranged on the outer surface of the frame 9 and individually attached to the frame 9 by means of brackets. These auxiliary units comprise the brake-air compressor 24 and the dynamo 25 located below said compressor on one side of the frame 9, the two units 24 and 25 being driven by means of a common V-belt 26 on the V-belt pulley 19. To the opposite side of the frame 9 the lubricating-oil filter 27 and the lubricating-oil cooler 28 located below the said filter as well as the water pump 29 arranged beneath these two units are attached. The latter is driven by the V-belt pulley 19 via a V-belt 32. The lubricating-oil pipe leading from the oil filter 27 to the cylinder block 1 is designated by reference number 30, and the lubricating-oil pipe from the engine to the lubricating-oil cooler 28 by reference number 31.

The water radiator 10 is connected with the cooling-water system of the cylinder block 1 in a manner known per se, the cooling-water hose from the outlet connection 35 of the cylinder head 36 to the inlet connection 37 of the water radiator 10 being designated by reference number 33, the connecting pipe from the radiator 10 to the suction end of the water pump 29 by reference number 38, and the cooling-water hose from the delivery end of the water pump 29 to the inlet connection 39 of the cylinder block 1 by reference number 34.

Separation of the auxiliary devices from the cylinder block 1 makes it possible for the external surfaces of the cylinder block 1 to be provided, as far as necessary, with a sound-absorbing coating of the required thickness, without having to take the location of auxiliary machines into account such as for example, by not applying the coating to such places where the said auxiliary devices are to be mounted on the cylinder block. Consequently, this method provides an opportunity for taking full advantage of the possibilities of attenuating sound projection from the large areas of the cylinder block. The separate arrangement of the accessories of the engine on a special equipment-carrier 8 with the intercalation of intermediate elements for the absorption of sound conducted through solids also eliminates transmission of engine vibrations to the auxiliary machines practically completely.

According to the embodiment of the invention illustrated in FIGS. 4 and 5, the fuel injection pump 44 is mounted on the cylinder block 41 of the internal combustion engine on one of the sidewalls 42 of the crankcase 43 in the usual manner. All of the remaining auxiliary machines and devices are arranged jointly on a separate equipment-carrier 45. The exposed external surfaces of the cylinder block 41 are provided with a very adhesive coating of some sound-absorbing material.

The equipment-carrier 45 comprises a rectangular frame 46, the members of which present a channel section. About in the middle of the upper frame, connecting plates 47 and 48 are attached to same on both sides, such as by screwing or welding. To the connecting plate 47 facing the cylinder block 41 as well as to the engine-end flange 49 of the lower truss of the frame 46 silent blocks 50 capable of absorbing sound conducted through solids, such as rubber elements for example, are attached and connected at the engine-end with the front-end 51 of the gearbox 52.

The auxiliary units of the internal combustion engine are arranged around the equipment-carrier 45 so as to reduce the overall length of the structural unit consisting of the cylinder block 41 and the equipment-carrier 45. To the left side of the equipment carrier 45 the lubricating-oil cooler 54 carrying the lubricating oil filter 53 is fastened. The water pump 55 for the water-cooling system of the internal combustion engine is located below the lubricating-oil cooler 54 and screwed on to the frame 46 with its flange 56.

On the right side of the frame the dynamo 57 is located and above same a brake-air compressor 59 is connected with the frame 46 by means of a bracket 58. Attached to the upper crossbar of the frame 46 another auxiliary machine, namely a hydraulic pump 60 is mounted which serves to feed the hydraulically operated servomechanisms, such as a hydraulic servo steering gear for example.

In front of the equipment carrier 45 the cooling-air-blower 61 is located. The blower impeller 62 is mounted in overhung position on the fan shaft 63 which is in turn attached to the connecting plate 48 of the equipment carrier 45. The water radiator located in front of the cooling-air blower 61 is designated by reference number 64.

All auxiliary machines are driven via V-belts 67 through 70 by means of a V-belt pulley 66 located at the end of an extension of the crankshaft 65.

Among the connecting pipes, only roughly outlined in the drawings, between the cylinder block 41 and the auxiliary units, the lubricating-oil pipes of the engine leading away from and to the lubricating-oil cooler 54, are designated by reference numbers 71 and 72. The cooling-water connecting pipe leading from the cylinder head 74 to the water radiator 64 is designated by reference number 73. The cooling-water return pipe leading to the crankcase 43 is designated by reference number 75.

We claim:

1. A soundproofed internal combustion engine having a cylinder block, a sound-absorbing coating on the outer surface of the said cylinder block, and auxiliary machines and accessories, comprising a cooling-air fan and a dynamo drivingly connected with a driven shaft of the said combustion engine, and an equipment-carrier in the form of an independent structural unit arranged in front of the said cylinder block and soundproofed against the cylinder block, the said auxiliary machines and accessories being mounted on the said equipment-carrier.

2. A soundproofed internal combustion engine according to claim 1, in which a frame is provided for the said equipment carrier on which the said auxiliary machines and accessories are detachably mounted.

3. A soundproofed internal combustion engine according to claim 2, in which silent blocks are provided mounted on the said frame at the points of attachment of the auxiliary machines and accessories.

4. A soundproofed internal combustion engine according to claim 1, in which soundproofing connections are provided intercalated between the said driven shaft of the engine and the said auxiliary machines drivingly connected with the said driven shaft.

5. A soundproofed internal combustion engine according to claim 4, in which the said connection is in the form of a drive shaft having a flexible plate-type joint at each extremity.

6. A soundproofed internal combustion engine according to claim 2, in which the said auxiliary machines and accessories comprise a water radiator located within the said frame, the said cooling-air fan being arranged behind the said water radiator, a brake-air compressor and the said dynamo with both mounted outwardly on one side of the said frame, a cooling-water pump mounted outwardly on the opposite side of the said frame, and a shaft drivingly connected with the said driven shaft of the engine, the said auxiliary machines being driven by the said shaft.

7. A soundproofed internal combustion engine according to claim 1, in which a hydrostatic driving connection is provided between the internal combustion engine and the said auxiliary machines, the said driving connection comprising an oil pump and an oil motor conductively connected with the said oil pump.

8. A soundproofed internal combustion engine according to claim 1, in which the equipment carrier is mounted on the said cylinder block and in which silent blocks are provided inserted between the said equipment carrier and the cylinder block.

9. A soundproofed internal combustion engine according to claim 8, in which the said equipment-carrier is in the form of a cast hollow body carrying said auxiliary machines and containing connecting channels for the delivery of oil and water to and from the said auxiliary machines.

References Cited

UNITED STATES PATENTS

| 1,422,995 | 7/1922 | Link. |
| 2,011,988 | 8/1935 | Timian _____ 180—64 |
| 2,467,077 | 4/1949 | Brunken. |

FOREIGN PATENTS

| 835,340 | 5/1960 | Great Britain. |
| 697,747 | 11/1964 | Canada. |
| 824,247 | 11/1937 | France. |
| 1,251,634 | 12/1960 | France. |

WENDELL E. BURNS, *Primary Examiner.*